H. A. ADLER.
DENTAL INSTRUMENT.
APPLICATION FILED NOV. 15, 1921.

1,424,707.

Patented Aug. 1, 1922.
2 SHEETS—SHEET 1.

WITNESSES
Milton Cohen
William D. Connolly

INVENTOR
Henry A. Adler
BY Nathan I. Adler
ATTORNEY

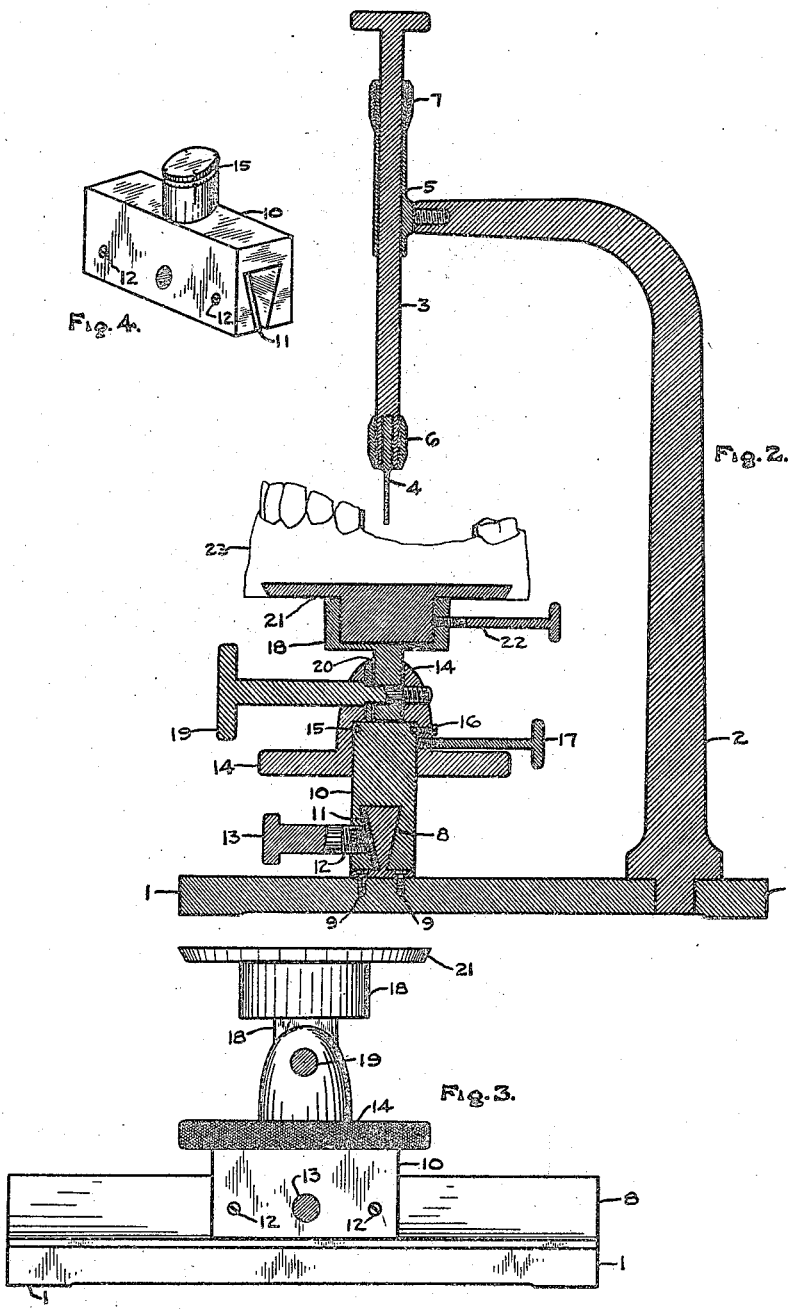

UNITED STATES PATENT OFFICE.

HENRY A. ADLER, OF NEW YORK, N. Y., ASSIGNOR TO ADLER ENGINEERING COMPANY, OF CORONA, LONG ISLAND, NEW YORK, A COPARTNERSHIP.

DENTAL INSTRUMENT.

1,424,707.   Specification of Letters Patent.   Patented Aug. 1, 1922.

Application filed November 15, 1921. Serial No. 515,266.

*To all whom it may concern:*

Be it known that I, HENRY A. ADLER, a citizen of the United States, and a resident of New York city, in the county of Queens, State of New York, have invented certain new and useful Improvements in Dental Instruments, of which the following is a full, clear, and exact specification, reference being had to the accompanying drawings, forming a part of this specification.

My invention relates to Improvements in those classes of dental instruments generally known as "parallelometers" and "parallelogauges." In the preparation and installation of both fixed and removable dental "bridge-work," as generally interpreted in the dental profession, the main object for the successful functuation of a constructed dental bridge, is the attainment of perfection of parallelism in the alignment of the supporting attachment on the dental bridge, and the abutments in the mouth to which the attachments are affixed, when the bridge is placed in the mouth. It is to achieve this result that the instrument hereinafter described and illustrated, has been contrived.

The principal object of my invention has been the production of such an instrument, wherein simplicity of construction and operation result in the attainment of the sought for degree of parallelism, required in the preparation and installation of both the fixed and removable dental bridge-work. Furthermore, due to the absence of all intricate and delicate parts in this instrument, no unusual skill is required for its operation, at the same time resulting in a high degree of serviceableness and durableness. Another feature of my invention, is the positiveness of the action of all the working parts, the instrument being so contrived that all the parts are well balanced.

In view of these aforesaid objects, and the further objects disclosed in the following description, the instrument forming the substance of this invention consists of the novel features of construction, and combination and arrangement of parts, hereinafter described and illustrated, and as particularly set forth in the claims appending the specification.

These objects I attain in the accompanying drawings illustrating a preferred embodiment of my invention, in which similar reference characters indicate corresponding parts in the various views.

In the accompanying drawings:

Fig. 2 is a lateral elevation of the instrument, showing each part in section.

Fig. 3 is a front elevational view of the instrument, the standard and holding arrangement for the mandrel being omitted.

Fig. 4 is a detail perspective of the rider element for the dental bridge model carriage arrangement.

Figure 1:
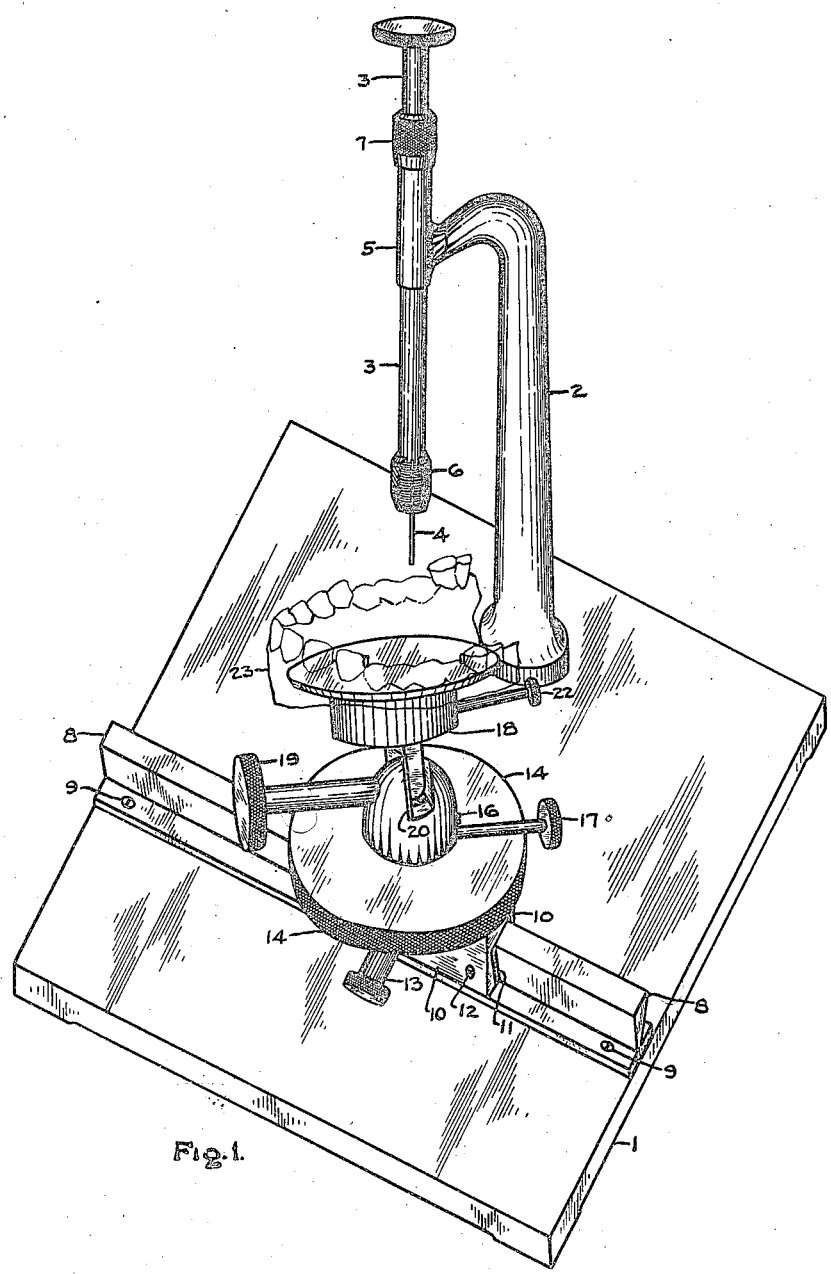
Figure 1 is a view of my instrument in perspective, with the mandrel locking nut partially in section, and a portion of the said nut cut away, revealing the slotted construction of the mandrel holder.

This instrument, referring to Figures 1 and 2, consists of the bed plate 1, upon which is rigidly mounted, as shown, the inverted L-shaped standard 2 supporting the mandrel carrying arrangement. The bed plate 1 also supports the dental bridge model carriage arrangement, which is mounted in such a manner on the bed plate, as to bring any location on the dental bridge model in the desired position in contact with the mandrel or other dental appliance or attachment that is being used in the holder. The dental bridge model 23, referring to Figures 1 and 2, mentioned hereinbefore, is the dental model, generally of clay, which supports the metallic dental preparation or bridge which is to be operated upon, or upon which is to be paralleled the desired dental attachment, and will be referred to hereinafter in the specification and claims, as the "dental model."

The mandrel carrying arrangement is composed of the mandrel holder 3, supporting, as showing in Figures 1 and 2, the mandrel 4 accommodated in the hollow portion provided at the lower extremity of the holder 3. Although I refer to this holding member 3 as a "mandrel holder," it may also be adapted to support other dental appliances, or dental attachment elements required in parallelization operations. The holder 3, which is both rotatable and vertically slidable, is supported by the bracket 5, which in turn is rigidly secured to the standard 2. The hollow portion at the lower extremity of the holder 3 is split, preferably in quadrants, referring to Fig. 1, supplying the tensioning means for holding the mandrel. The hollow portion of the holder 3 is also threaded externally, to engage with the internally threaded mandrel locking nut 6; the down or up movement of the nut 6 resulting respectively in relieving or fixedly holding the mandrel in the desired position. The upper extremity of the holder 3 terminates in a knob, reference being had to Figures 1 and 2, used as a manipulating means for the holder. The combination of the holder element 3 and the locking nut element 6, referred to above, may be termed the "chuck," for the mandrel or other dental appliance.

The bracket 5, hollow throughout its entire length, acts as the bearing for the holder 3, allowing the said holder to be slid vertically up or down, or rotated, at will. The bracket 5 is threaded externally for a short distance at its upper extremity, this threaded section being also split, preferably in quadrants. This threaded portion of the bracket 5 is engaged by the internally threaded mandrel holder locking nut 7, the up or down movement of this nut 7 resulting respectively in allowing the holder 3 to be rotated and moved up or down, or held fixedly in any desired position in the bracket. The means of securing the bracket 5 to the standard 2, I show by the engagement of the threaded stub extending at right angles to the body of the bracket, with a correspondingly threaded opening in the upper terminus of the standard, reference being had to Fig. 2.

The dental model carriage arrangement derives its lateral movement from the manner of its mounting on the flanged triangular guide or rail 8, referring to Figures 1, 2 and 3. The rail 8 is rigidly fixed on the bed plate 1, the flanged section being secured thereto by the flat head screws 9, the disposition of the rail 8 on the bed plate 1 being such as to obtain the most efficient scope of manipulation between the mandrel or dental appliance held in the chuck, and the dental model being operated upon. Although, in the accompanying drawings I have shown the rail 8 of a length equal to the width of the bed plate 1, this has only been done arbitrarily.

Mounted to form a dovetail fit over the rail 8 and so that it is adapted to ride thereon, is shown the rider element 10 of the dental model carriage arrangement, referring to any of the drawings. The rider 10 has a free range of movement over the entire length of the rail 8. It is obvious that there should be as little as possible of play between the vertical contact surfaces of the rail 8 and the rider 10. In consideration of this, there is shown positioned in contact with the inner surface of that side of the rider 10, furthest from the standard 2 only on account of its superior accessibility, the flat rectangular shim plate 11, referring to Figures 1, 2 and 4. The shim plate 11 is secured against the inner surface of the rider 10, referring in particular to Figures 2, 3 and 4, by the screws 12, two being shown in these instances, these screws 12 also serving as the adjusting means for the movement of the shim plate 11, so as to take up for the frictional wear on either the shim plate 11, or cooperating surface of the rail 8. The rider 10 is held against movement, in any desired position on the rail 8, by the binding set screw 13, reference being had to Fig. 2. The screw 13 is positioned in the tapped hole in the side of the rider 10, preferably as shown in Fig. 2, operating against the side of the rail 8 through the shim plate 11.

The upper portion of the rider 10 is formed into a cylindrical head, referring particularly to Fig. 4, which journals in a corresponding opening in the turning element 14, of the dental model carriage arrangement. This circular opening provided in the lower central portion of the turning element 14, referring to Fig. 2, acts as a movable bearing for the head of the rider 10, so that it is revolvable thereon, in a horizontal plane. Near the top of the head of the rider 10, is disposed, peripherally, the groove 15, reference being had to Figures 2 and 4. Through the body of the turning element 14, is positioned the screw 16, as shown in Fig. 2, so that the extremity of this screw 16 rides in the groove 15, thereby preventing any vertical movement in the operation of the turning element 14. The turning element 14 is held fixedly in any desired position about the head of the rider 10, by the tensioning action of the binding set screw 17, shown in Figures 1 and 2, this screw 17 being positioned through the tapped hole in the body of the turning element 14, so that it acts against the head of the rider 10. The head of the rider 10, referring to Fig. 4, I show split, in this instance in quadrants, to provide against any side play in the operation of the turning element 14. This turning element 14 is the means by which the dental model carriage arrangement derives a rotating motion, the turning element 14 permitting the dental model to be revolved, at will, in either a clockwise or counter-clockwise direction, but only in the horizontal plane.

The top of the turning element 14 is shown, referring to Figures 1, 2 and 3, formed into a domed head. Through the top of this domed head of the turning element 14 is cut a recess, reference being had to Figures 1, 2 and 3, in which pivots the leg of the cup-shaped retainer 18, in the hollow portion of which rides the cylindrical leg of the table 22, supporting the dental model. The leg of the retainer 18 pivots on the smaller diametered portion of the shank of the shouldered binding screw 19, shown in Fig. 2. This shouldered binding screw 19 is positioned centrally through the recessed domed head of the turning element 14, with the larger diametered portion of its shank riding in a through hole in one lip of the recessed dome, and the smaller diametered portion of its shank, the extremity of which is threaded, engaging in a correspondingly threaded hole, positioned in the other lip of the recessed dome. The shouldered portion of the binding screw 19 butts against the washer element 20, shown in Figures 1, 2 and 4, disposed on the smaller diametered portion of the shank of the binding screw 19, in the recessed part of domed head, between the side of the retainer leg and inner face of the lip formed by the recess, as shown. Thus by tensioning the binding screw 19, the washer element 20 is forced against the leg of the retainer 18, thereby acting as the means for securing the retainer at rest, at the desired angle. The pivoting movement of the retainer 18 is the means by which the desired angular adjustment, for operation on the dental model, is obtained.

The table member 21 is shown, referring to Figs. 1, 2 and 3, formed of the circular, chosen arbitrarily, top, at right angles to the cylindrical leg. The top of the table 21 is positioned directly in the lower part of of the dental model, that is, it is to be cast into the clay of the dental model, preferably with the lower surface of top of the table flush with the bottom of the dental model, this being the means for holding the dental model 23 on the table 21. The cylindrical leg of the table 21 is adapted to journal in the cooperative opening in the retainer 18, which serves as the holding means for the table 21, so that the table and the dental model may be revolved, in either direction, at will. From its manner of mounting it will be seen that the dental model, may be revolved at will, while in any angular position obtained by the adjustment of the retainer 18. The table 21 and its dental model 23 are held at rest in any desired position in the angular plane, by the tensioning action of binding screw 22, positioned in a tapped hole in the wall of the retainer 18, as shown in Figures 1, 2 and 3, against the leg of the table 21.

From the foregoing, it will now be observed that the dental model 23 supported on the table 21, is possessed firstly, of a range of lateral movement, in a horizontal plane, limited only by the length of the rail 8. Secondly, it is possessed of a complete rotary movement, also in a horizontal plane, this rotary movement being equivalent to a movement at right angles to the mentioned lateral movement for any point on the dental model, equal, when a maximum, to twice the distance of this point from the central axis of rotation. Thirdly, the dental model 23 is possessed of a complete angular adjustment, within the range of operation of the dental tool held by the chuck member; the dental model being also capable of a complete rotative movement in the plane of any angular adjustment. This angular movement and rotative movement in the angular plane, is equivalent to a universal movement for the dental model 23. And, due to the various movements just enumerated for the dental model, any position thereon can be readily brought in line of operation with the dental tool held by the chuck member, as desired.

This instrument, forming the substance of the invention, may also be used for laying out clasps on individual teeth. To perform this operation it would only be necessary to use some marking means, such as a piece of writing lead, in the holder 3. Again this instrument may be readily used for orthodonture work, the tubes, in this case, being placed in position by employment of the chuck arrangement. And, in a like manner there are a number of other dental operations that can be readily performed with the instrument, embodied herein.

Herein I have illustrated and described a simple and particular embodiment of my invention, and I wish to set forth that the details of construction, dimensions, and general arrangement of the various parts, may be considerably modified without departing from the spirit and scope of the invention, expressed in my claims.

What I claim is:—

1. In a dental instrument of the class described, the combination of a base member, a standard mounted fixedly thereon, a mandrel carrying arrangement simultaneously rotatable and vertically adjustable supported by said standard, and an adjustable carriage arrangement for the dental model movably mounted on said base member, permitting the dental model to be shifted and revolved in the horizontal plane, also angled through a range of 180 degrees and revolved in any angular position, to bring the desired location on the dental model in the line of operation of the mandrel or other dental appliance, substantially as described.

2. In a dental instrument of the class described, the combination of a bed plate, a standard member rigidly mounted thereon, a bracket fixedly held by said standard, a mandrel holder supported both rotatable and vertically adjustable in said bracket, a mandrel adaptably held in said mandrel holder, a mandrel holder locking nut for locking the said mandrel carrier against any movement, a mandrel locking nut for securely holding the mandrel in position in its holder, and an adjustable carriage arrangement for the dental model movably mounted on said bed plate, substantially as described.

3. In a dental paralleling apparatus, the combination of a bed plate member, a standard rigidly mounted thereon, a chuck member carrying bracket securely supported on said standard, a chuck member adjustably supported in said bracket, a mandrel or other dental appliance or attachment to be held by said chuck member, a locking means for locking said chuck member in a desired position in its bracket, and a rail member rigidly mounted on said bed plate and serving as the guide for the movement of the dental model carriage arrangement, so that the required position on the dental bridge model can be readily brought in operative engagement with the mandrel or other dental appliance being used, substantially as described.

4. In a dental instrument of the class described, the combination of a bed plate member, an inverted L-shaped standard rigidly mounted thereon, an adjustable mandrel or other dental appliance carrying arrangement supported by said standard, a rail member rigidly mounted on said bed plate, a rider element adapted to move horizontally on said rail member, a shim plate element located between one face of rider element and corresponding face of rail element to compensate for subsequent wear in engaging surfaces, a screw means for adjusting said shim plate, a binding set screw member for locking rider element in a desired location on said rail member, a turning element adapted to rotate in a horizontal plane on split head of said rider element, a screw element positioned through turning element and engaging in corresponding groove disposed about split head of said rider element and serving as the guide means for the rotation of the turning element in the horizontal plane, a second binding set screw member for locking the said turning element against rotation, and a rotatable angularly movable table means supporting dental model, substantially as described.

5. In a dental instrument of the class described, the combination of a bed plate member, an inverted L-shaped upright rigidly mounted thereon, an adjustable carrying arrangement for the operating dental appliance supported by said upright, a rail member securely fixed on said bed plate, a rider or slider element adapted to move in contact with said rail, a means for locking said rider element at rest, a turning element rotatively supported on split head of said rider element, a screw guide means for limiting rotative movement of said turning element to the horizontal plane, a means for locking said turning element at rest, a retaining element for table member with lower portion pivotally supported in cooperative recess disposed in head of said turning element, a shouldered locking screw member cooperatively positioned in head of said turning element with leg of said retainer element pivoting on shank thereof, said locking screw serving as the means for locking said retaining element at rest, a washer element disposed on shank of said locking screw and acting as the binding means for locking said retainer element at rest, and a table means for holding dental model, substantially as set forth.

6. In a dental instrument of the class described, the combination of a bed plate member, an upright member rigidly mounted thereon, an adjustable mandrel carrying arrangement supported by said upright, a rail member fixedly positioned on said bed plate, a rider element moving on said rail, a locking means for said rider element, a turning element journaling on split head of said rider element, a screw guide means for said turning element, a locking means for said turning element, an angularly adjustable retainer element supporting the table means, a shouldered locking screw member for locking said retainer element in the required angular adjustment, a washer binding means for said retainer element, a table member adapted to be cast into the dental model with leg of said table rotatively supported in corresponding opening in upper portion of said retainer element, and a binding screw member positioned in wall of upper portion of retainer element for locking said table at rest, substantially as set forth.

HENRY A. ADLER.

Witnesses:
CHARLES L. TURCK,
JACOB GANZ.